(12) United States Patent
Suganuma

(10) Patent No.: US 7,278,915 B2
(45) Date of Patent: Oct. 9, 2007

(54) GAME MACHINE

(75) Inventor: Masanori Suganuma, Tokyo (JP)

(73) Assignee: Konami Gaming Incorporated, Las Vegas, NV (US)

( * ) Notice: Subject to any disclaimer, the term of this patent is extended or adjusted under 35 U.S.C. 154(b) by 883 days.

(21) Appl. No.: 10/456,559

(22) Filed: Jun. 9, 2003

(65) Prior Publication Data

US 2004/0014525 A1    Jan. 22, 2004

(30) Foreign Application Priority Data

Jun. 12, 2002    (JP)    .......................... P2002-171319

(51) Int. Cl.
*A63F 9/24* (2006.01)
(52) U.S. Cl. ......................................... 463/16; 463/30
(58) Field of Classification Search .................... None
See application file for complete search history.

(56) References Cited

U.S. PATENT DOCUMENTS 5,393,057 A * 2/1995 Marnell, II .................. 463/13

FOREIGN PATENT DOCUMENTS

EP        0449433 A2 *   10/1991
JP        11-290505 A    10/1999

* cited by examiner

*Primary Examiner*—Mark Sager
(74) *Attorney, Agent, or Firm*—Sughrue Mion Pllc.

(57) ABSTRACT

A game machine includes a first display and a second display. The first display displays an image of a first game. The first game provides a plurality of symbols in either a moving condition or a stopping condition, and provides a state being advantageous to a player in the case that a predetermined pattern of the symbols is constituted when the plurality of symbols are stopped. The second display displays an image of a second game which is different from the first game. The first game and the second game proceed simultaneously The image of the first game and the image of the second game are concurrently displayed in the first display and the second display respectively.

5 Claims, 10 Drawing Sheets

GAME MACHINE

BACKGROUND OF THE INVENTION

The invention relates to a game machine capable of controlling two or more types of games which differ from each other, and more particularly, to a game machine which displays images of the games simultaneously, the games proceeding in parallel with each other.

In the background of recent growing demand for game machines, there is provided game machines wherein a single game machine is equipped with a game program for controlling images of games of a plurality of types.

For example, a game machine described in, e.g., JP-A-11-290505 has a secondary game in addition to an ordinary game. The secondary game is proceeded in accordance with a result of the ordinary game, thereby a profit margin of a player on account of the secondary game is increased and an expectancy to the game is afforded.

The hardware configuration of the game machine of this type will now be briefly described. As shown in FIG. 12A, the game machine includes a game storage section 10 for storing a game A program 10A, a game B program 10B, . . . , and a game X program 10X; a game selection section 12 which selects one from the game programs stored in the game storage section 10; a program control section 14 for controlling the game program selected by the game selection section 12; a game display and operation section 16 by which a game executed by the program control section 14 is operated and which displays an image of the game; and a game-progress storage section 18 for storing a progress status of a game.

As shown in FIG. 12B, according to operation processing of the game machine, a desired game is selected from the game storage section 10 (S100). In this case, the game selection section 12 selects only one game program to be executed from the plurality of game programs.

Only the game selected in step S100 is executed (S101A to S101X). For instance, when only a game A program is selected, the game A is proceeded as an independent game.

When the game executed in the previously-described step is completed (i.e., when a game is settled for the time being), a result of the game is stored in the game-progress storage section 18 (S102).

Processing starts again from step S100, and a game different from the previous game is selected. During the course of the game being in progress, information based on the result of the game stored in the game-progress storage section 18 is reflected in the progress.

As mentioned above, the related game has a plurality of games, that is, a game A, a game B, . . . , a game X which differ from one another. However, the related game machine performs a control such that the another game is proceeded after one game has been completed, because the games does not have an association in the game therebetween. Even when a characteristic of each game provides a variety of game presentations, overall effects of the presentations are weakened.

Especially, in a game machine having a plurality of games, each of the games is proceeded independently in order to prevent a creation of confusion for the player.

However, in association with advancement in a game and complication of features thereof, the game skill of the player improves. For this reason, "confusion" which would be introduced for the player is a relative term. The player has a very small chance of being bewildered by simultaneous progress in a plurality of games. Conversely, the present inventor has found that provision of these game characteristics results in further enhancement of amusement for the player.

Factors which introduce confusion for the player lie particularly in a case where games, which proceed exclusively in association with the player's operation (e.g., a shooting game or a role-playing game), are caused to proceed simultaneously. In contrast, in a case where games, which are caused to proceed by a computer after having been started by the player's operation, are simultaneously executed, the player is not required to perform complicated operations, and hence creation of confusion seems to be avoided.

In a game proceeded by a computer after having been started by the player's operation, the player's awareness is invoked when the player performs operation or when a result of progress in the game is displayed. The player can distract his/her awareness toward another matter while the games are proceeded by the computer. Even when a plurality of games are proceeded simultaneously, the player can readily enjoy playing the games without suffering confusion, so long as points which invoke the player's awareness are dispersed in advance.

SUMMARY OF THE INVENTION

It is therefore an object of the present invention to provide a game machine which offers a new game characteristic and enhances amusement for the player by causing two or more types of games to proceed in parallel and displaying the games simultaneously.

The invention also provides a game machine which enables diversification of game rules or game presentation by rendering an association between two or more types of games, which are simultaneously proceeded and displayed.

In order to achieve the above object, according to the present invention, there is provided a game machine comprising:
 a display, for displaying an image of a game in association with a progress of the game,
 wherein a first game and a second game, which is different from the first game, proceed simultaneously; and
 wherein an image of the first game and an image of the second game are concurrently displayed in different display regions of the display.

In the above configuration, different games of two or more types are caused to proceed simultaneously and are displayed concurrently. Hence, the invention can offer a new game characteristic which enables a player to simultaneously enjoy playing games of different types and can enhance amusement for the player.

As described by the term "different display regions of the display", images of the games of two or more types are displayed in the single display. The two or more types of games are displayed within a range visible for the player without requiring the player to change his/her a point of view according to the type of game, thereby enabling the player to readily enjoy playing the games.

Preferably, at least one of information regarding a progress of the first game and information regarding a result of the first game is outputted as a new element for the second game.

In the above configuration, different games of two or more types are taken as "a first game" and "a second game", respectively In addition to the games being simultaneously caused to proceed and displayed, information regarding the progress and/or result of the first game is taken as an element for the second game, thereby associating the games with each other in terms of nature of the games.

Accordingly, rules and presentations of the first game are taken as elements for the second game, thus affecting the other game. The player can enjoy presentations of the first game while simultaneously enjoying the elements of the second game stemming from presentation. Hence, effects of game presentations can be enhanced synergistically. Consequently, the game presentations can be diversified. Moreover, there can also be provided a new game rule according to which information regarding the progress and/or result of the first game is taken as a new element for the second game. Thereby enabling diversification of game rules or game presentation by associating the games with each other in terms of their natures.

Consideration is given to time-consequence dispersion of a player's awareness of games even when a plurality of games are caused to proceed simultaneously. Hence, the player can readily enjoy playing games without suffering confusion.

Different games of two or more types which are associated with each other in terms of their natures are caused to simultaneously proceed and be displayed. As a result, the two or more types of games proceed on a screen visible for the player. However, as a result of the games being associated with each other, the player who is playing the games has the impression that only one game is proceeding instead of the impression that the two or more types of games are proceeding. In this regard, a new game characteristic can be offered.

According to the present invention, there is also provided a game machine comprising:

a display, for displaying an image of a game in association with a progress of the game; and a controller, for controlling different games of two or more types, wherein the controller proceeds a first game and a second game which is different from the first game simultaneously; and wherein the controller concurrently displays an image of the first game and an image of the second game in different display regions of the display.

In the above configuration, different games of two or more types are simultaneously caused to proceed and be displayed. Hence, the invention can offer a new game characteristic which enables the player to simultaneously enjoy playing games of different types and enhance amusement for the player.

Here, images of the game are displayed in "different display regions of the display" and hence the display where the images of the games are to be displayed are partitioned. A content of the first game can be displayed in an upper area of the display, and a content of the second game can be displayed in a lower area of the same.

Here, the respective display areas in the "different display regions" assume arbitrary sizes. Hence, when the first game is taken as a main game and the second game as a sub-game, a display area where image of the main game are to be displayed can be set so as to become larger than a display area where image of the sub-game are to be displayed.

Preferably, the controller outputs at least one of information regarding a progress of the first game and information regarding a result of the first game as a new element for the second game.

In the above configuration, the invention enables games being associated with each other in terms of their natures and synergistic enhancement of entire effects of game presentations by outputting information about the progress and/or result of the first game as an element for the second game. Consequently, game presentations can be diversified.

Preferably, the controller outputs at least one of information regarding a progress of the second game and information regarding a result of the second game as a new element for the first game.

In the above configuration, an association between the games are more increased, thereby diversifying the game presentations further.

According to the present invention, there is also provided a game machine comprising:

a first display, displaying an image of a first game which provides a plurality of symbols in either a moving condition or a stopping condition, and which provides a situation being advantageous to a player in the case that a predetermined pattern of the symbols is constituted when the plurality of symbols are stopped; and a second display, displaying an image of a second game which is different from the first game, wherein the first game and the second game proceed simultaneously; and wherein the image of the first game and the image of the second game are concurrently displayed in the first display and the second display respectively.

In the above configuration, a game machine which keeps in advance, for different games of two or more types, a "first game which provides a plurality of moving symbols and which provides a situation being advantageous to a player in the case that a predetermined pattern of the symbols are constituted when the plurality of symbols are stopped" and a "second game differing in type from the first game," and which enables simultaneous progression and display of the two games.

In the first game, moving and stopping of the plurality of symbols are performed by the player's operation and/or automatically. The plurality of symbols assume a predetermined pattern only through selection processing to be performed by a computer. Hence, the player can cause both the first and second games to proceed without paying concentrated attention to the first game and in consideration of the concurrently-displayed second game.

Here, the "first display" and the "second display" may be configured of separate display devices. Alternatively, the "first display" and the "second display" may be configured of a single display device. When the first and second displays are configured of a single display device, a display area is partitioned.

Preferably, a new element is output to the second game which proceeds concurrently with the first game in the case that the plurality of the symbols constitute the predetermined pattern when the plurality of symbols are stopped as a result of execution of the first game.

In the above configuration, the first game affects the second game, and a new element is output to the second game as a result of the "predetermined pattern" having been achieved by the information regarding the progress or a result of the first game, thereby causing the second game to continue. The player can enjoy a presentation, such as achievement of the "predetermined pattern" in the first game and the second game proceeding as a result of the presentation, as well. As a result, the overall effects of the game presentations can be enhanced synergistically, and the game presentations can be eventually diversified.

Preferably, a new element is output to the second game which proceeds concurrently with the first game in the case that the plurality of the symbols constitute the predetermined pattern when the plurality of symbols are stopped as a result of execution of the first game.

In the above configuration, the present invention enables synergistic enhancement of the overall effects of game presentations by the second game affecting the first game. Consequently, the game presentations can be diversified.

Preferably, a new element is output to the second game which proceeds concurrently with the first game in the case that the plurality of the symbols constitute the predetermined pattern when the plurality of symbols are stopped as a result of execution of the first game.

Preferably, the first game is shifted to a third game having a predetermined selection process when the first game received the new element from the second game satisfies a predetermined condition.

Here, a mechanical selection process or a program-controlled selection process can be mentioned as the "predetermined selection process" A roulette game can be mentioned as a third game having a mechanical selection process.

[Definitions of Terms]

The term "simultaneous proceed" means a state in which games of two or more types are proceeding to such an extent that changes in contents of the games can be visually ascertained through a display. The term does not encompass a game machine in which two or more types of games are eventually subjected to simultaneous progress; for example, the game machine which is described in JP-A-11-290505 and in which a second game proceeds (changes) according to a result of a first game even when the second game remains unchanged during the course of progress of the first game.

The term "simultaneous display" means a state in which images of games of two or more types are displayed in the display. Accordingly, the term does not encompass a game machine wherein two or more types of games are proceeding concurrently from a program viewpoint but wherein images of a first game are displayed and then those of second game are displayed after erasure of the images of the first game.

The term "progress information" means information regarding a game which has not yet been completed but remains proceeding. An example of this arises in a combination game (or a like game) in which operation of a left symbol from a varying state to a stoppage, operation of a center symbol from a varying state to a stoppage, and operation of a right symbol from a varying state to a stoppage are taken as one cycle, a LI-ZHI (a state in which one step short of a win) has already been achieved by the left and center symbols when the right symbol is in course of being changed with the left and center symbols remaining halted.

Here, the term "result information" means information regarding a certain game when one round of the game has been finished. For instance, information signifies a winning state of the combination game in which the left symbol, the center symbol, and the right symbol having come to a halt each assume identical symbols.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 4A and 4B are views separately showing respective states of the game machine of the embodiment in which details of a game are displayed on a display section, wherein FIG. 4A shows a state in which the details are shown in a first display region, and FIG. 4B shows a state in which the details are shown in a second display region;

FIGS. 12A and 12B are descriptive views of a related-art game machine, wherein FIG. 12A shows a hardware configuration of the game machine, and FIG. 12B is a view showing operation processing of the game machine.

DETAILED DESCRIPTION OF THE PREFERRED EMBODIMENTS

A first embodiment of the invention will be described hereinbelow by reference to the drawings. A game machine according to the first embodiment of the invention will be described by employing two or more types of different games, for example a first game and a second game. The first game provides a plurality of symbols which are depicted so as to move and stop, and which provides a situation in which a player can gain an advantage when the plurality of symbols are stopped so that a predetermined pattern of the symbols is constituted (i.e., a combination game). Further, the second game is a roulette game with dice. However, the invention is not limited to these games.

[Hardware Configuration of the Game Machine]

Figure 1:
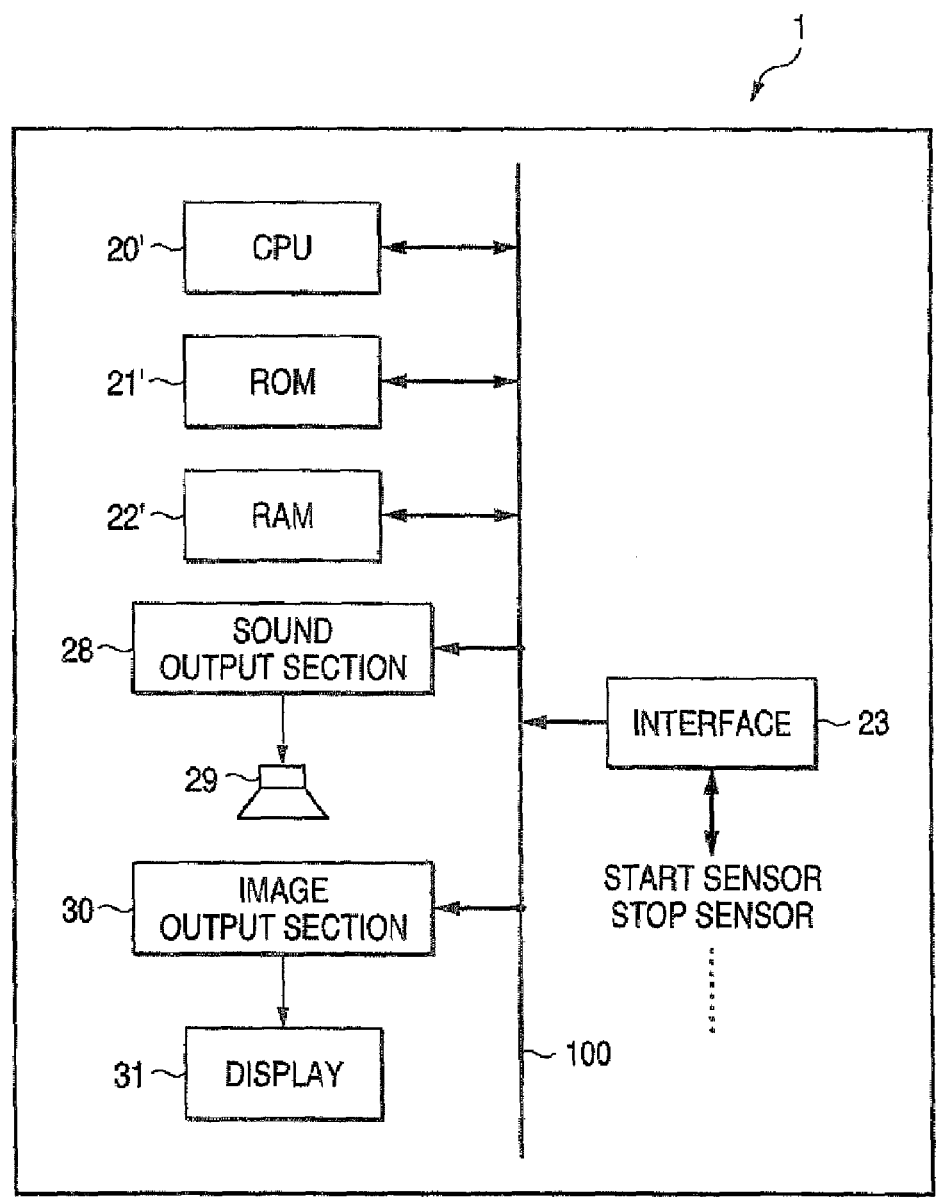
FIG. 1 is a hardware block diagram of a game machine according to an embodiment of the invention.

FIG. 1 is a hardware block diagram of a game machine 1 according to the first embodiment of the invention. The hardware configuration is usually employed for a commercial (or TV) game machine. However, the invention is not limited to this hardware configuration.

The game machine 1 is connected to various types of devices via a bus 100. The game machine 1 of the first embodiment is connected to a CPU 20', ROM 21', RAM 22', an interface 23, sound output section 28, and image output section 30.

The CPU 20' reads a program or data stored in the ROM 21' and controls the game machine 1 through use of the program or data.

The ROM 21' stores game programs for two or more types of different games, respectively. Specifically, the game machine of the first embodiment stores a game program for a first game and a program for a roulette game with dice which is taken as a second game. In the first game, a plurality of symbols which are depicted so as to move and stop is provided. When the plurality of symbols are stopped so that a predetermined pattern of the symbols are constituted, there is provided a situation in which the player can gain an advantage.

The RAM 22' provides a work area where the CPU 20' executes a program.

The interface 23 interconnects other devices which perform various operations in accordance with instructions output from the CPU 20'. A start sensor, a stop sensor, and the like, are connected to the interface 23.

In this way, the game machine 1 loads a program or data stored in the ROM 21' in accordance with an instruction output from the CPU 20' and controls an image to be displayed on a display section 31 or sound to be emitted from a speaker 29 through use of the program or data.

[Simultaneous Progress of Games]

Next will be described a game machine in which two or more different types of games are proceeded simultaneously.

The inside of the CPU is generally divided into a plurality of units. The units fulfill different functions (e.g., a fetch function, which is an operation for loading an instruction; a decoding function, which is an operation for analyzing an instruction, the function of executing an instruction, and others). Simultaneous progress and display of two or more types of games are enabled by adoption of a pipeline processing scheme which utilizes these functions and introduction of a time-and-space multiplex control method. For instance, after completion of a fetch operation belonging to Process 1, a decoding operation belonging to Process 1 is commenced. A fetch unit which has been brought into a standby condition executes a fetch operation belonging to Process 2.

The game machine 1 that has introduced such a time-and-space multiplex control method can store a plurality of types of game programs in the ROM 21' shown in FIG. 1 and cause the CPU 20' serving as a single controller to execute the game programs simultaneously.

[Association of Games]

By reference to FIG. 2, there will now be described a game machine having the function of outputting information about progress of the first game (hereinafter called "progress information about the first game") and information about a result of the first game (hereinafter called "result information about the first game") as new elements for the second game, and information about progress of the second game (also called "progress information about the second game") and information about a result of the second game (also called "result information about the second game") as new elements for the first game.

The game machine having such a function is configured so as to enable each of a plurality of initiated programs to invade a program area of another program, by interrupting the other program.

Figure 2:
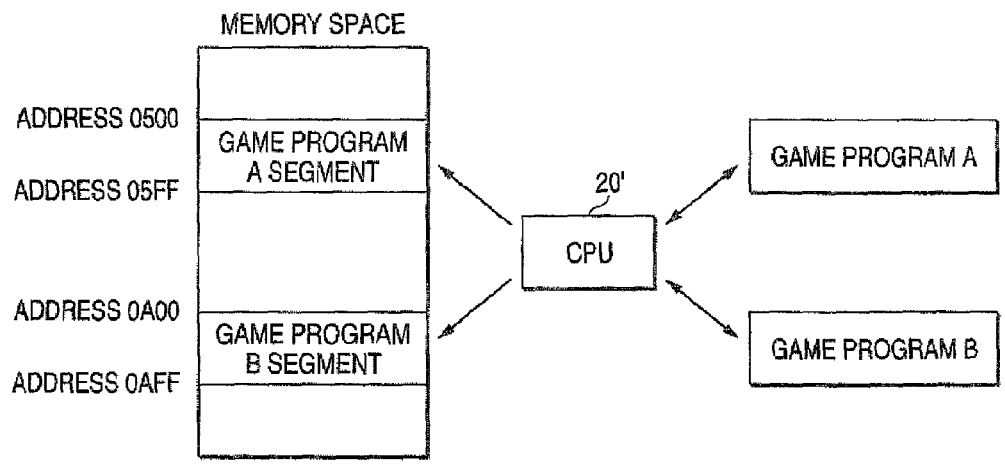
FIG. 2 is a diagram showing a flow of data in the game machine of the embodiment.

More specifically, as shown in FIG. 2, descriptions of a game program A for the first game are written directly into a game program A segment serving as an area of the game program A under control of the CPU 20'. The descriptions are displayed on the display section 31. Likewise, descriptions of a game program B for the second game are written into a game program B segment serving as an area of the game program B under control of the CPU 20'. The descriptions are displayed on the display section 31.

By processing of the game program A for the first game, the CPU 20' adds a new element to the second game, thereby outputting the progress information and the result information of the first game, as new game elements for the second game. In such a case, the progress information and the result information of the first game transmitted by the CPU 20', are sent to the game program B segment in accordance with a game program B segment write enable signal output from the CPU 20', thereby adding changes to the second game.

Similarly, by processing of the game program B for the second game, the CPU 20' adds a game element to the first game, thereby outputting the progress information and the result information of the second game, as a new game element for the first game. In such a case, the progress information and the result information of the second game transmitted by the CPU 20', are sent to the game program A segment in accordance with a game program A segment write enable signal output from the CPU 20', thereby adding changes to the first game.

The CPU 20' enables the plurality of types of games to mutually invade the program areas of the respective games while causing the games to proceed. As a result, progress information and result information about a certain game can be reflected on another game as an element.

Specific Example

A specific example of the game machine 1 of the embodiment will be described hereinbelow.

Figure 3:
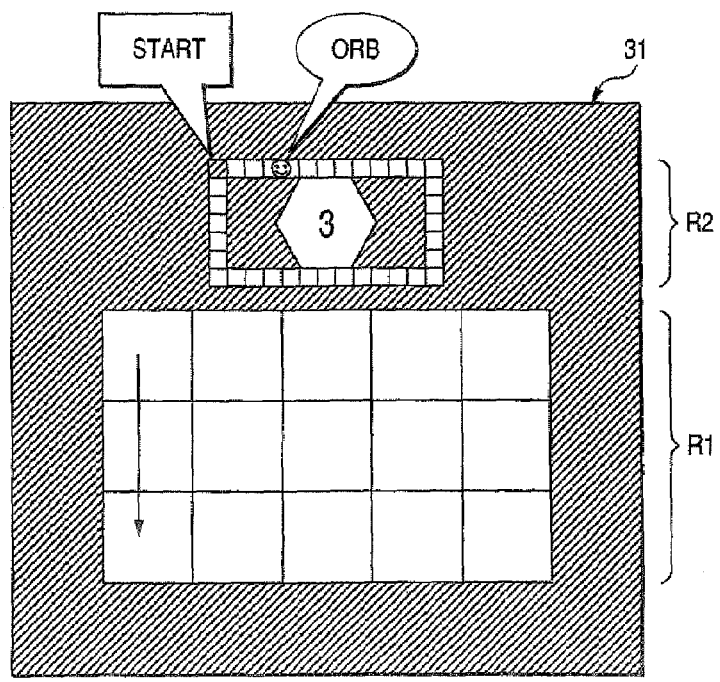
FIG. 3 is a view showing a state of the game machine of the embodiment in which images of a game are displayed on a display section.

FIG. 3 is a view of the game machine 1 according to the first embodiment, wherein a combination game is taken as the first game and a backgammon is taken as a second game and wherein details of the respective games are simultaneously displayed on the display section 31.

More specifically, the display section 31 is partitioned into two regions: that is, a lower region being taken as a first display region R1, and an upper region being taken as a second display region R2. A combination game, which is the first game, is displayed in the first display region R1, and the backgammon, which is the second game, is displayed in the second display region R2.

Here, like an ordinary combination game, the combination game (first game) determines occurrence of a WIN when identical symbols are aligned. In the backgammon (second game), polyhedral dice are rotated within the center of the second display region shown in FIG. 3. When the polyhedral dice are stopped, a checker is advanced over only squares equal in number to the numeral displayed at the dice. The start position of the checker is determined at the time of initiation of a game (i.e., when credit is established). Progress of the game is shown to the player by appearance of a symbol of the checker or illumination of the current position of the checker.

Figure 5:
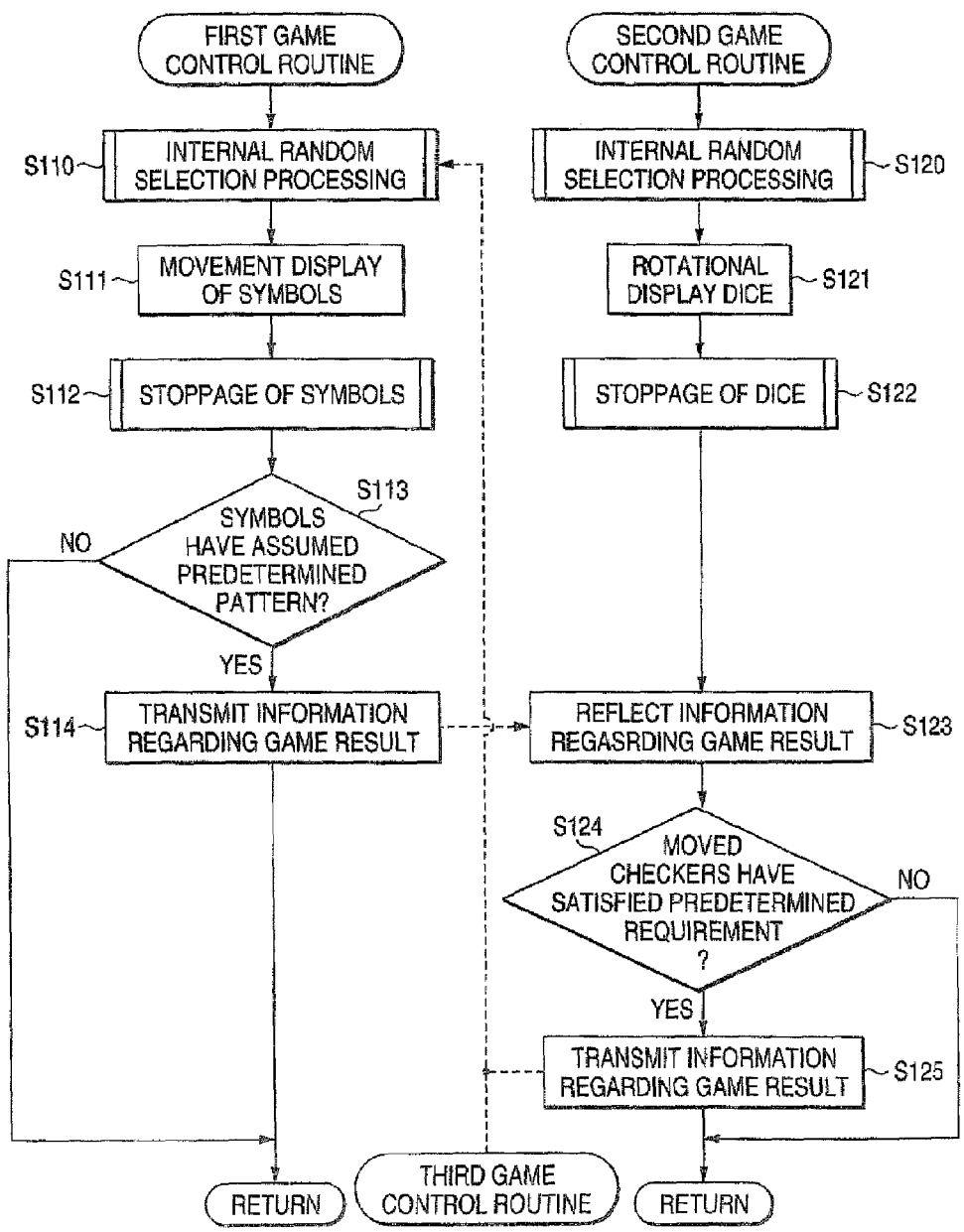
FIG. 5 is a flowchart showing a game control routine of the game machine of the embodiment.

Reference is now made to FIG. 5. When the player inserts credits into the game machine 1 (e.g., when the player inserts game tokens) and start of the game is cued, internal random selection processing is performed in the first and second games (S110, S120). In relation to the first game, internal random selection processing is performed by the CPU 20', thereby determining a combination of the symbols when the symbols are stopped. Similarly, in relation to the second game, the CPU 20' performs internal random selection processing, thereby determining the number of orbs to appear along a route (i.e., a path over which checkers are moved).

Next, a moving of the displayed symbols is started in connection with the first game (S111), and a rotation of the displayed polyhedral dice is started in connection with the second game (S121). The moving of the symbols and the rotation of the polyhedral dice may be performed simultaneously by the player's single operation. Alternatively, the moving of the symbols and the rotation of the polyhedral dice may be performed sequentially in the sequence of a first reel, a second reel, . . . a fifth reel, and the backgammon, by respective operations of the player.

In relation to the first game, processing for stopping the symbols is performed (S112). The processing for stopping the symbols is performed when previously-set stop requirements, such as lapse of a predetermined period of time, are satisfied. In a combination game machine, processing for stopping symbols can be prompted by an operation for pressing stop buttons before lapse of a predetermined period of time.

Figure 4A:
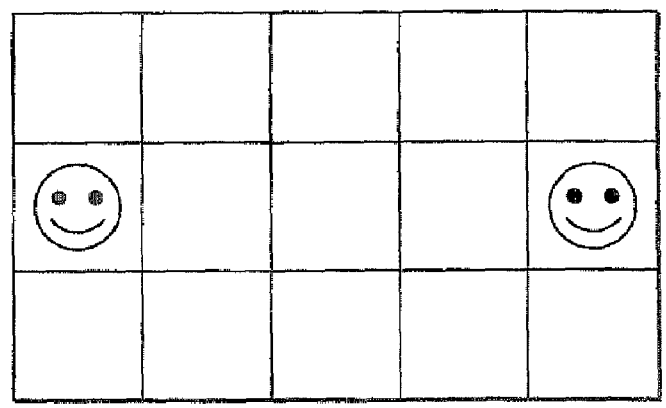

The first game is stopped in step S112, and a determination is made as to whether or not the symbols displayed in the display section 31 constitutes a predetermined pattern of the symbols (S113). As shown in FIG. 4A, a case where specific symbols are displayed on the first and fifth reels during the combination game is mentioned as one example of the "predetermined pattern". When such a predetermined pattern is displayed, YES is determined in step S113, whereupon game result information about the combination game; that is, the first game, is transmitted (S114).

Figure 4B:
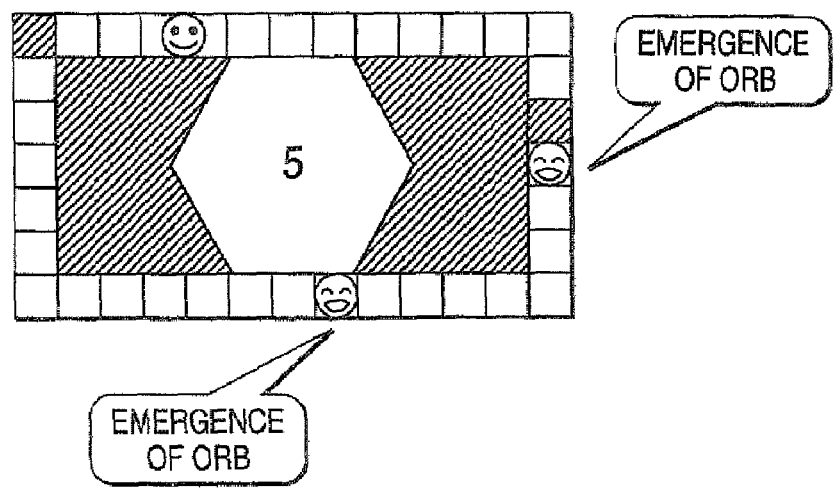

In relation to the second game, processing for stopping the polyhedral dice is performed simultaneously with halting of the first game (S122). The checker appeared on the route advances over only a distance corresponding to the number of squares displayed as a result of execution of the stop processing of the polyhedral dice. At this time, the transmitted result information about the first game is loaded, and the game result information is reflected on the second game in order to output the result information as an element for the second game (S123). Specifically, as shown in FIG. 4B, emergence of orbs at arbitrary positions along the route in the second display region R2 is displayed in connection with the second game. In this way, an increase in the number of orbs along the route results in enhancement of the chance of the checker stopping on an orb, which in turn enhances the player's expectation for occurrence of the gackgammon. Thus, a state in which the player can gain an advantage is offered. In the embodiment, the symbols associated with the orbs employed in the second game are substantially identical with the symbols associated with the symbols employed in the first game. However, the invention is not limited to the form of the symbols between the orbs and the symbols displayed on the display.

As mentioned above, a new element for the second game is output on the basis of information about the result of the first game. The second game is continued such that the checker moves over only the number of squares displayed by the polyhedral dice.

Next, a determination is made as to whether or not the thus-moved checker has satisfied predetermined requirements (S124). A case where the checker is stopped on the orb is mentioned as an example of the "predetermined requirements". In this case, the following advantages are obtained.

First, the result information about the second game is sent to a third selection game; e.g., an electrical or mechanical roulette game, which is offered as a final bonus game (S125). The third game is initiated, and a final payout for the player is determined according to the result of selection of the third game.

Second, the result information about the second game is sent in order to change the elements of the first game (S125). The CPU 20' performs internal random selection operation so as to offer a state in which the player can gain an advantage (S110), thereby outputting a new game element. More specifically, even when any win advantageous to the player in the first game is achieved as a result of a change being made to the game elements of the first game, the predetermined pattern of the symbols involving a shift to a bonus game, is not performed through single control operation of the first game. A shift is made to a bonus game exclusively as a result of the second game. Hence, the first and second games are associated with each other in light of the natures of the games, thereby diversifying the game presentations.

In this way, the result information about the first game is output as a new element for the second game. The result information can be used to trigger shifting of the current game to a third game, or the result information about the second game can be output as a new element for the first game.

Figure 9:
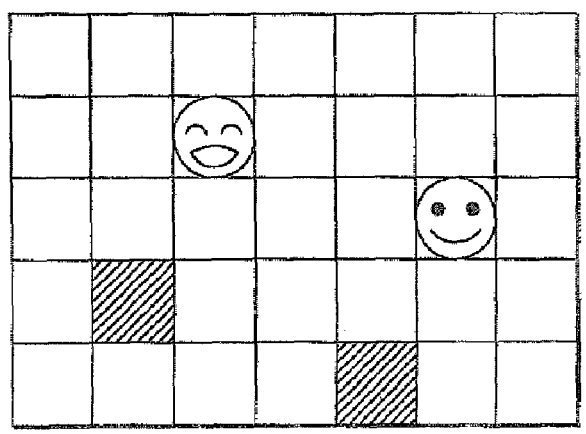
FIG. 9 is a view showing another example of the game machine of the embodiment, wherein details are shown in the second display region.

In the specific example, the backgammon which determines the number of squares by spinning dice or the like is displayed in the second display region R2 where the second game is to be displayed. However, the invention is not limited to this game. For instance, as shown in FIG. 9, there is also mentioned a game, in which, when specific symbols are displayed on predetermined reels during the combination game; i.e., the first game, orbs emerge arbitrarily, and the checkers randomly move over the route.

The above description has stated that information about the result of a game is output as a new element for another game. The following description explains a case where information about the progress and result of a game is taken as a new element for another game.

First, a case where information about the progress of a game is taken as a new element for another game will be described by reference to FIG. 4A.

According to the previous description, result information about a game corresponds to the predetermined pattern of the displayed symbols when all reels are stopped; that is, the first to fifth reels are stopped. For example, when the reels are stopped in sequence of the first reel, the second reel, . . . , the fifth reel, specific symbols are displayed on the first and fifth reels, which correspond to the result information about a game. In a game machine which enables a change in the sequence in which the reels are to be stopped by the player's arbitrary selection, even when other reels still remain spinning at a point in time when the player has stopped the first reel and then the fifth reel, no change arises in the specific symbols having been displayed on the first and fifth reels. Therefore, progress information about the game can be taken as a new element for another game.

Next, a case where progress information and result information, both pertaining to a game, are taken as new elements for another game will now be described by reference to FIG. 4A. A conceivable case is that, under the assumption that specific symbols are displayed on the first and fifth reels during the first game, thereby causing the second game to continuously run by outputting new game elements to the second game. However, the new game elements are determined when the specific symbol is also displayed on the third reel during the first game.

Specifically, under a situation in which the player stops the reels in sequence of the first reel, the fifth reel, . . . , the third reel, when specific symbols are displayed as a result of stoppage of the first reel and subsequent stoppage of the fifth reel, progress information of the first game is written into the second game program region. An orb is caused to emerge along the route in the second game, and a new game element is output to the second game. However, the thus-emerged orb is not yet determined through blinking display. It is assumed that emergence of an orb is determined when a specific symbol is displayed on the third reel after the third reel has come to a halt. Under such an assumption, when the specific symbol is displayed on the third reel, information about the result of the game is written into the second game program region. Blinking of the orb is changed to illumination, thereby determining emergence of the orb. In contrast, if no specific symbol is displayed on the third reel, information about the result of the game is written into the second game program region, thereby deleting the orb from the screen.

As mentioned above, when a predetermined pattern, e.g., "WIN," is achieved in the first game or second game to which the new game element is sent, the current game shifts to a third game which differs from the first and second games. For example, a roulette game typified by a game having a mechanical selection method can be mentioned as a third game.

As shown in time sequence in FIG. 5, the above description has explained the game machine which simultaneously causes the first and second games to proceed and outputs information about the progress and result of the first game as an element for the second game while the first game has not yet been fully completed, and the game machine which simultaneously causes the first and second games to proceed and outputs information about the progress and result of the second game as an element for the first game while the second game has not yet been fully completed. Thus, the game machine reflects the information about the progress and result of a game to another game of the same round (e.g., a first round in the first game or a first round in the second game). The invention can also reflect information about the progress and result of a game achieved until a certain round onto another game in a different round.

Specifically, the information about progress and result of the first game achieved after completion of the first round is reflected not on the first round of the second game which proceeds simultaneously with the first game, but on the second round of the second game.

Figure 6:
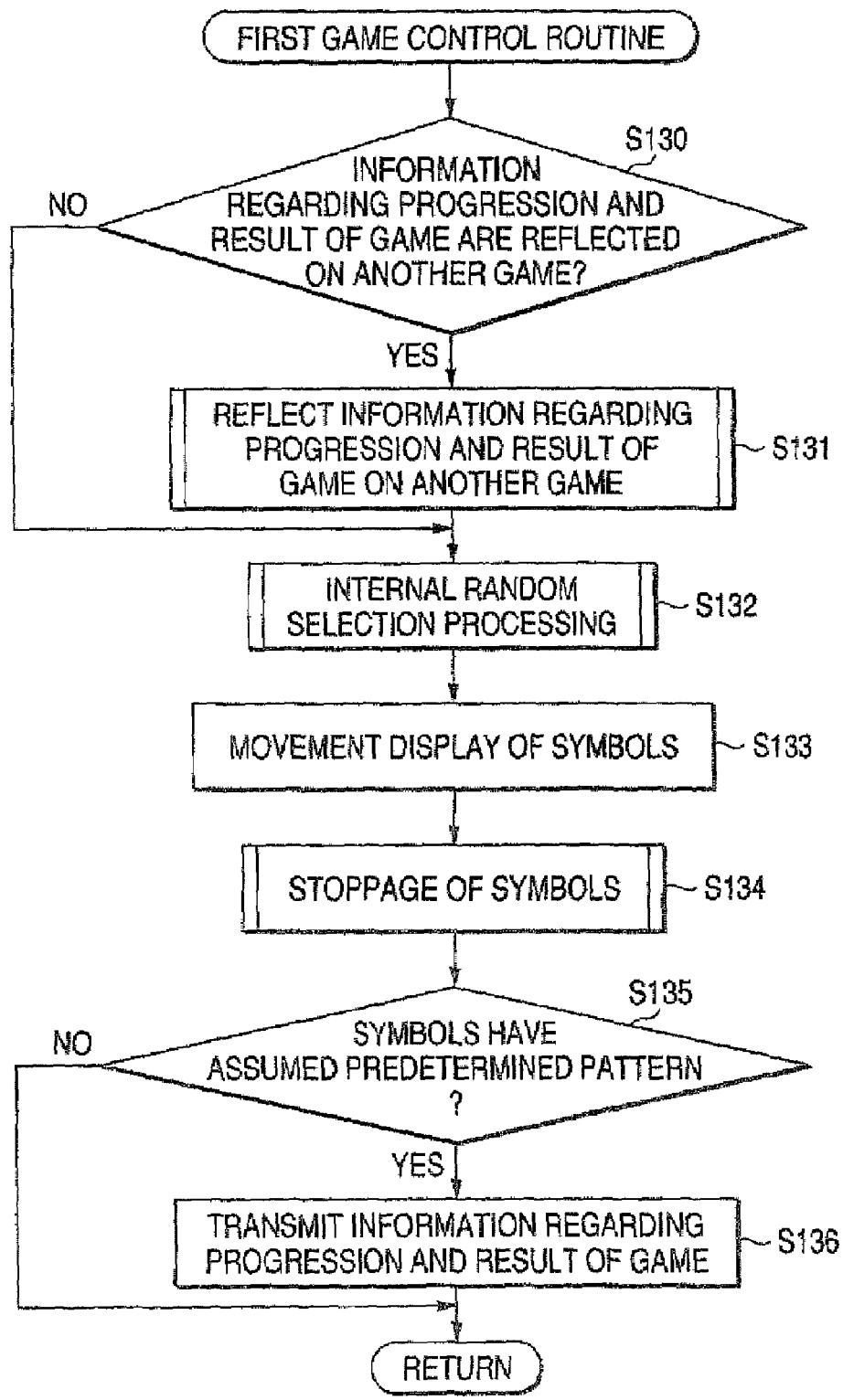
FIG. 6 is a flowchart showing a first game control routine of the game machine of the embodiment.
Figure 7:
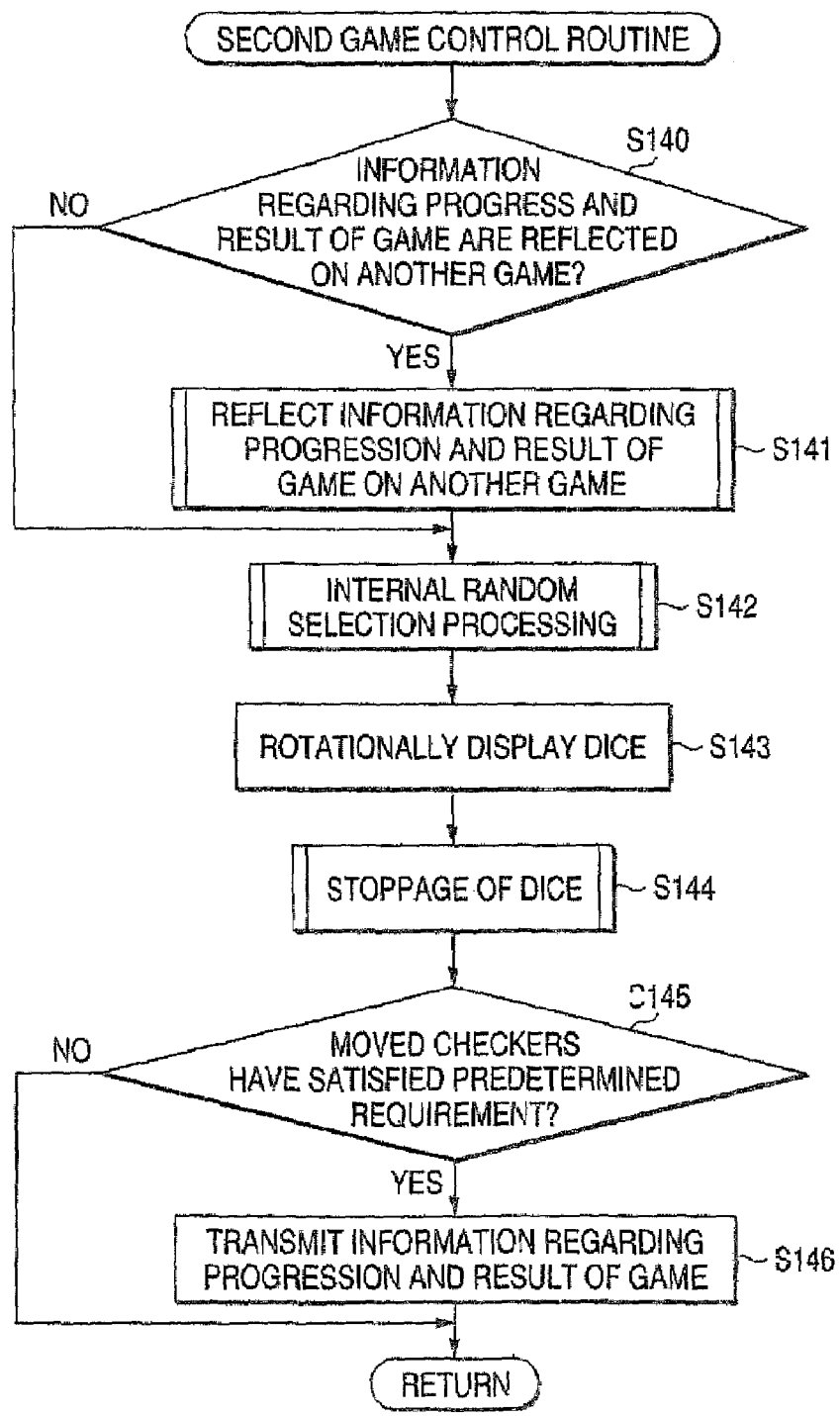
FIG. 7 is a flowchart showing a second game control routine of the game machine of the embodiment.

In this case, as shown in FIGS. 6 and 7, when each round is started, a determination is made as to whether or not the information about the progress and result of another game achieved in a previous round is reflected on that round (S130, S140). When the information about the progress and result of the game is determined to be reflected, each program is rewritten so as to reflect the information on the round (S131, S141), thereby affecting the internal random selection processing (S132, S142). In contrast, when the information about the progress and result of the game is determined not to be reflected on the round, ordinary internal random selection processing is performed.

In this way, the information about the progress and results of the games achieved until the previous round is reflected at the time of initiation of respective rounds of the first and second games. Subsequently, the games are caused to proceed in accordance with control routines of the respective games such as those shown in steps S111 to S114 and S121 to S125 shown in FIG. 5. Hence, the same processing operations are associated with steps of effecting the same control operations, and hence repetition of their explanations is omitted.

Figure 8:
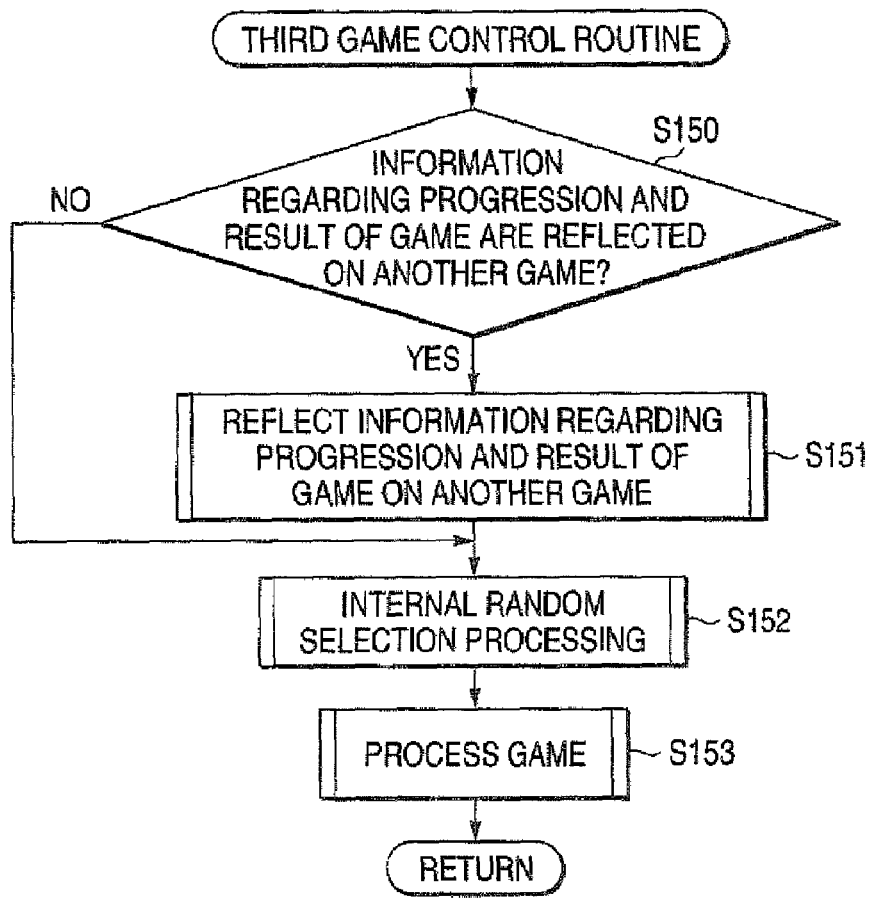
FIG. 8 is a flowchart showing a third game control routine of the game machine of the embodiment.

FIG. 8 is a flowchart showing a game control routine of the third game of the game machine according to the embodiment. Here, the third game is a game employing a program control random selection method (e.g., a roulette game). In the third game, a determination is made as to whether or not the information about the progress and result of the first game and/or the progress and result of the second game is reflected on the third game (S150). Internal random selection processing is performed while the information about the progress and result of the game is reflected on the processing (S151 to S152), or ordinary internal random selection processing is performed (S152).

The above descriptions show a case where the invention is applied to the game machine. However, the invention can also be applied to an amusement machine, such as a Pachinko machine or a slot machine, regardless of the type of the amusement machine.

Second Embodiment of the Invention

Figure 10:
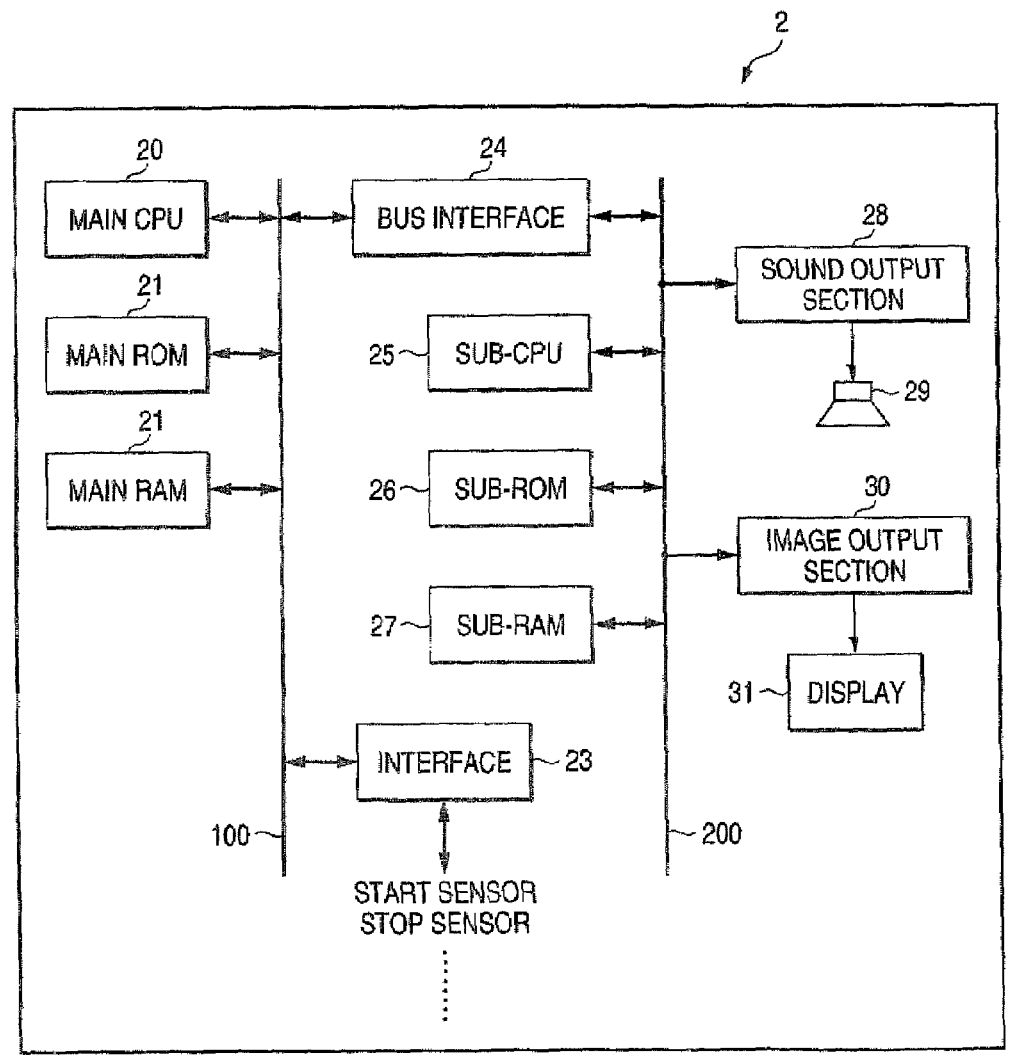
FIG. 10 is a hardware block diagram of a game machine (i.e., an amusement machine) according to a second embodiment of the invention.
Figure 11:
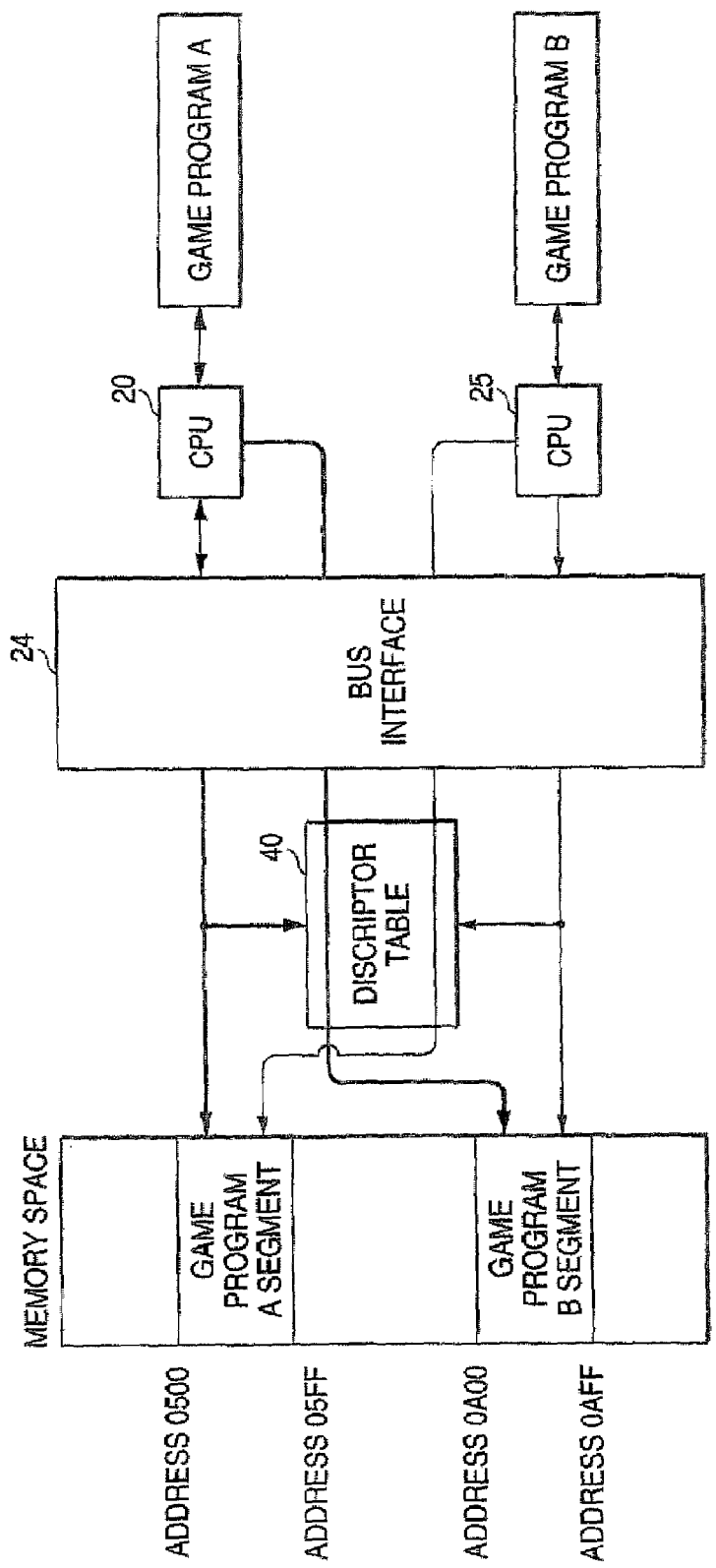
FIG. 11 is a diagram showing flow of data in the game machine (the amusement machine) of the second embodiment.
Figure 12A:
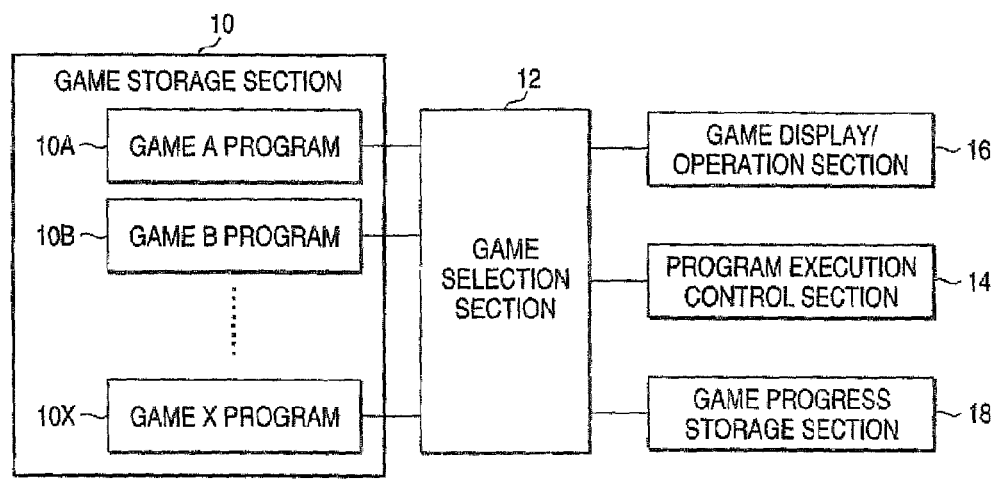
Figure 12B:
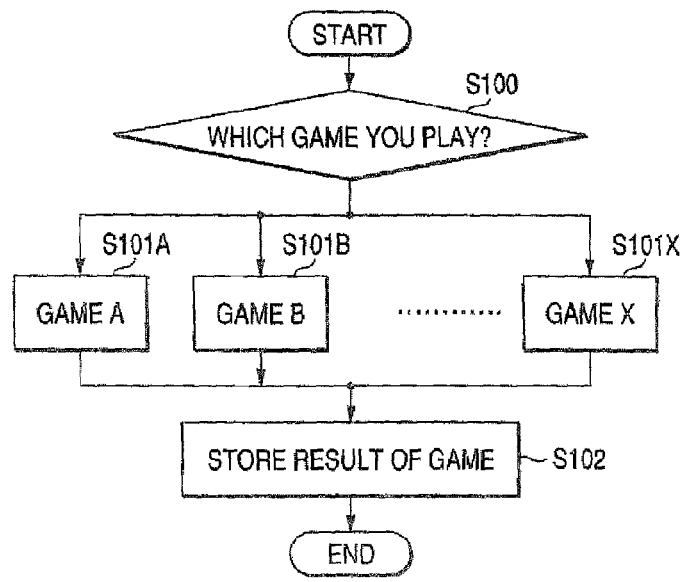

FIG. 10 is a hardware block diagram of a game machine 2 obtained when the invention is applied to the game machine 2. FIG. 11 shows flow of data in the game machine 2.

[Hardware Configuration of the Game Machine]

The game machine 2 has one main bus 100 and two sub-buses 200. These buses are interconnected by way of a bus interface 24.

The main bus 100 is connected to a main CPU 20, main ROM 21, main RAM 22, and an interface 23.

The main CPU 20 reads programs and data stored in the main ROM 21 and controls the game machine 1 through use of the program or data. The ROM 21 stores game programs for two or more types of different games, respectively. Specifically, the game machine of the embodiment takes, as a first game, a game in which a plurality of symbols are displayed so as to move and stop and provides a state in which the player can gain an advantage when the plurality of symbols constitutes a predetermined pattern, and game programs are stored in the game machine.

The main RAM 22 provides a work area where the CPU 20 executes a program.

The interface 23 interconnects other devices which perform various operations in accordance with instructions output from the CPU 20. A start sensor, a stop sensor, and the like are connected to the interface 23.

A sub-bus 200 is connected to a sub-CPU 25, sub-ROM 26, sub-RAM 27, sound output section 28, and image output section 30.

The sub-CPU 25 performs various control operations in association with the main CPU 20. In the game machine 1 of the embodiment, the sub-CPU 25 loads a program and data stored in the sub-ROM 26 in accordance with an instruction output from the main CPU 20 via a bus interface 24 and controls an image to be displayed on the display section 31 and sound to be emitted from the speaker 29, by use of the thus-loaded program or data.

The sub-ROM 26 stores game programs for two or more types of different games, respectively. A roulette game with dice is taken as a second game, and a game program for the roulette game is stored in the game machine of the second embodiment.

The sub-RAM 27 provides a work area to be used for the sub-CPU 25 in executing a program.

As mentioned above, the game machine 2 has a plurality of CPUs, and the main CPU 20 manages progress of a game. The sub-CPU 25 controls a sound effect, display of an image, and so on.

[Simultaneous Progress of Games]

Next will be described a game machine in which two or more different types of games are proceeded simultaneously.

As in the case of the game machine 2 of the second embodiment, when a different controller is used on a per-game basis, a game program for the first game is stored in the main ROM 21 in the manner mentioned above. A game program for the second game is stored in the sub-ROM 26, and the main CPU 20 and the sub-CPU 25 can execute the game programs. In this case, the bus interface 24 can effect synchronization of a clock frequency between the main CPU 20 and the sub-CPU 25.

In particular, under the assumption that the first and second games are proceeded simultaneously and be displayed concurrently, the first game being a main game and the second game being a sub-game, and that the second game proceeds without a necessity for the player's operation, an image which does not require the player's operation is displayed during the second game. Hence, relegating control of the second game to the sub-CPU 25, which controls sound effects, display of an image, and so on, is preferable in terms of expedient processing of the game.

[Association of Games]

A game machine which outputs information about the progress and a result of the first game as a new game element for the second game and outputs information about the progress and a result of the second game as a new game element for the first game will now be described by reference to FIG. 11.

The game machine having such a function is configured so as to enable each of a plurality of initiated programs to invade a program area of another program, by interrupting the other program.

More specifically, as shown in FIG. 11, descriptions of a game program A for the first game are written directly into a game program A segment serving as an area of the game program A under control of the CPU 20 by way of the bus interface 24. The descriptions are displayed on the display section 31. Likewise, descriptions of a game program B for the second game are written into a game program B segment serving as an area of the game program B under control of the CPU 20 by way of the bus interface 24. The descriptions are displayed on the display section 31.

At this time, the information about the game program A is written into an area allocated to the game program A (addresses 0500 to 05FF) through management of the areas and addresses ensured for respective processes to be performed by a descriptor table 40 which serves as memory area management section for managing memory areas. Information about the game program B is written into areas (addresses 0A00 to 0AFF) allocated to the game program B.

By processing of the game program A for the first game, the CPU 20 adds a game element to the second game, thereby outputting the progress information and the result information, both pertaining to the first game, as new game elements for the second game. In such a case, the progress information and the result information, which pertain to the first game and are transmitted by the CPU 20, are sent to the descriptor table 40 by way of the bus interface 24. In accordance with a game program A segment write enable signal output from the CPU 20, the descriptor table 40 sends the progress and result information pertaining to the second game to the game program A segment, thereby adding modifications to the first game.

In this way, mutual invasion to program areas of a plurality of types of games can be performed by management of the descriptor table 40 while the games are being caused to proceed. Therefore, information about the progress and result of a certain game can be reflected on another game as game elements.

The descriptions have mentioned the game machine 1 and the game machine 2 while differentiating therebetween. However, the distinction is attributable to a difference in generally-employed hardware configurations. Hence, as a matter of course, a term "game machine," which is an object of the right of the invention, conceptually encompasses the game machine 2 as well as the game machine 1.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A game machine comprising:
   a display, for displaying an image of a game in association with a progress of the game; and
   a controller, for controlling different games of two or more types;
   wherein the controller proceeds a first game, and a second game which is different from the first game, simultaneously;
   the controller concurrently displays an image of the first game and an image of the second game in different display regions of the display;
   the controller outputs at least one of information regarding a progress of the first game, and information regarding a result of the first game, as a new element for the second game; and
   the controller outputs at least one of information regarding a progress of the second game, and information regarding a result of the second game, as a new element for the first game.

2. A game machine comprising:
   a first display, displaying an image of a first game which provides a plurality of symbols in either a moving condition or a stopping condition, and which provides a situation being advantageous to a player in the case that a predetermined pattern of the symbols is constituted when the plurality of symbols are stopped; and
   a second display, displaying an image of a second game which is different from the first game;
   wherein the first game and the second game proceed simultaneously;
   the image of the first game and the image of the second game are concurrently displayed in the first display and the second display respectively; and
   a new element is output to the first game in order to provide a state being advantageous to the player when at least one of information regarding progress of the second game and information regarding a result of the second game is satisfied a predetermined condition.

3. The game machine as set forth in claim 2, wherein a new element is output to the second game which proceeds concurrently with the first game in the case that the plurality of the symbols constitute the predetermined pattern when the plurality of symbols are stopped as a result of execution of the first game.

4. The game machine as set forth in claim 3, wherein the second game is shifted to a third game having a predetermined selection process when the second game received the new element from the first game satisfies a predetermined condition.

5. The game machine as set forth in claim 2, wherein the first game is shifted to a third game having a predetermined selection process when the first game received the new element from the second game satisfies a predetermined condition.

* * * * *